(12) United States Patent
Hammonds

(10) Patent No.: US 7,905,302 B2
(45) Date of Patent: Mar. 15, 2011

(54) OMNI-DIRECTIONAL AIRCRAFT GALLEY SERVICING VEHICLE

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 426 days.

(21) Appl. No.: 12/070,398

(22) Filed: Feb. 19, 2008

(65) Prior Publication Data

US 2009/0205909 A1  Aug. 20, 2009

(51) Int. Cl.
*B66B 9/16* (2006.01)

(52) U.S. Cl. .......... 180/6.2; 187/240; 180/326; 180/327; 180/89.13; 180/7.2

(58) Field of Classification Search ............ 180/6.2, 180/326, 327, 89.13, 7.2; 187/240
See application file for complete search history.

(56) References Cited

U.S. PATENT DOCUMENTS

| | | | |
|---|---|---|---|
| 75,274 A | 3/1868 | Hurd | |
| 1,467,456 A | 9/1923 | Silvius | |
| 2,869,686 A | 1/1959 | Glanz | |
| 3,154,162 A | 10/1964 | McCaleb et al. | |
| 3,763,945 A | 10/1973 | Danielson | |
| 3,820,790 A | 6/1974 | Peterson | |
| 3,938,608 A | 2/1976 | Folco-Zambelli | |
| 4,077,647 A | 3/1978 | Nagayama | |
| 4,111,273 A | 9/1978 | Blackburn et al. | |
| 4,142,599 A | 3/1979 | Schmitt | |
| 4,301,881 A | 11/1981 | Griffin | |
| 4,306,329 A | 12/1981 | Yokoi | |
| 4,308,713 A | 1/1982 | James | |
| 4,324,301 A | 4/1982 | Eyerly | |
| 4,463,821 A | 8/1984 | Falamak | |
| 4,638,445 A | 1/1987 | Mattaboni | |
| 4,655,470 A | 4/1987 | Lin | |
| 4,973,206 A | 11/1990 | Engle | |
| 5,090,185 A | 2/1992 | Meeks | |
| 5,139,102 A | 8/1992 | Pocapalia | |
| 5,139,279 A * | 8/1992 | Roberts | 180/409 |
| 5,163,273 A | 11/1992 | Wojtkowski | |
| 5,246,081 A | 9/1993 | Engle | |
| 5,305,805 A | 4/1994 | Watkins, Jr. | |
| 5,330,222 A | 7/1994 | Halverson et al. | |
| 5,381,987 A | 1/1995 | Carns | |
| 5,404,695 A | 4/1995 | Gemelli | |
| 5,484,030 A | 1/1996 | Glenn | |

(Continued)

FOREIGN PATENT DOCUMENTS

JP   62-283072   12/1987

(Continued)

*Primary Examiner* — Joanne Silbermann
*Assistant Examiner* — Jacob Knutson
(74) *Attorney, Agent, or Firm* — James E. Hudson, III; Crain, Caton & James, P.C.

(57) ABSTRACT

A powered omni-directional aircraft galley servicing vehicle that includes a circular frame and two drive wheels capable of independent powered forward and rearward rotation about a horizontal axis. The drive wheels are adapted to allow the vehicle to spin in place about a vertical axis which intersects the horizontal axis midway between the drive wheels and which is generally centered in the circular frame. A carrousel cabin is mounted to the frame on a lift such that it is capable of elevation to an aircraft galley. A partitioned lazy susan storage compartment rotates on the carrousel cabin to facilitate transfer of aircraft food and drink carts between an aircraft galley and the servicing vehicle.

20 Claims, 6 Drawing Sheets

U.S. PATENT DOCUMENTS

| | | | |
|---|---|---|---|
| 5,516,169 | A | 5/1996 | Falk et al. |
| 5,623,818 | A | 4/1997 | Ledbetter |
| 5,704,201 | A | 1/1998 | Van Vleet |
| 5,720,077 | A | 2/1998 | Nakamura et al. |
| 5,893,398 | A | 4/1999 | Garrett, Jr. |
| 6,095,267 | A | 8/2000 | Goodman |
| 6,095,268 | A | 8/2000 | Jones, Jr. |
| 6,112,838 | A | 9/2000 | Klein et al. |
| 6,250,663 | B1 | 6/2001 | Maloy |
| 6,276,750 | B1 * | 8/2001 | Frisch ........................ 296/190.1 |
| 6,408,970 | B1 | 6/2002 | Eng |
| 6,481,515 | B1 | 11/2002 | Kirkpatrick et al. |
| 6,581,703 | B2 | 6/2003 | Hammonds |
| 6,668,471 | B1 | 12/2003 | Cook et al. |
| 6,830,114 | B2 * | 12/2004 | Hammonds .................... 180/6.2 |
| 7,040,425 | B2 | 5/2006 | Hammonds |
| 2003/0213626 | A1 | 11/2003 | Hafendorfer |
| 2003/0222447 | A1 | 12/2003 | Powell |
| 2004/0079560 | A1 | 4/2004 | Hammonds |
| 2005/0173163 | A1 | 8/2005 | Hammonds |
| 2006/0283669 | A1 * | 12/2006 | Patten et al. .................. 187/269 |

FOREIGN PATENT DOCUMENTS

WO    WO 2007/100878    9/2007

* cited by examiner

OMNI-DIRECTIONAL AIRCRAFT GALLEY SERVICING VEHICLE

BACKGROUND OF THE INVENTION

1. Field of the Invention

This invention relates generally to a wheeled vehicle designed to turn about a vertical axis. In particular, the invention relates to powered utility riding vehicles of the type useful for aircraft galley servicing operations.

2. Description of the Prior Art

FIGS. 1 and 2 illustrate a conventional aircraft servicing vehicle (100) of prior art, also known as a cabin service vehicle or a catering lift. Galley service vehicle (100) consists essentially of a vehicle chassis (102) (i.e., a frame (104), power plant (106) and cab (108)) and a platform or cabin (110) supported by a lift (112) mounted to the frame (104). FIG. 1 shows galley service vehicle (100) configured with cabin (110) in an elevated position by a scissor lift (112), allowing personnel to transfer supplies, food and drink carts, etc. between cabin (110) and the galley of a large aircraft (not illustrated).

FIG. 2 shows galley service vehicle (100) configured with cabin (110) in a stowed position, allowing personnel to transfer supplies, food and drink carts etc. between cabin (110) and a catering depot at the airport (not illustrated).

Conventional aircraft galley servicing vehicles (100) are typically configured with two axles, one (114) in the rear, the other (116) in the front. The rear axle has non-steerable wheels (115) and provides motive force; two steerable wheels (117) are located at the front end of the vehicle. As there is a distance between the axis of the rear drive wheels (115) and the axis of the front steerable wheels (117), a turning radius is required that far exceeds the space actually occupied by the vehicle itself. The longer the distance between the front and rear axles (116, 114), the larger is the turning radius that is required to change direction of the vehicle. A large turning radius makes maneuvering around crowded airfields difficult and often dangerous.

To back prior art galley service vehicle (100), operators are required to look over their shoulders, usually via a rear view mirror. The large cabin (110) creates significant blind spots, making reversing the vehicle (100) hazardous. A need exists for an aircraft galley service vehicle that requires less maneuvering space and eliminates the need for "blind" backing so that ground crew personnel, operator, and aircraft safety are enhanced.

3. Identification of Objects of the Invention

A primary object of the invention is to provide a ground support vehicle that has enhanced maneuverability for servicing aircraft galleys.

Another object of the invention is to provide an aircraft galley service vehicle that can turn on the spot and be of the smallest physical size relative to the space it occupies.

Another object of the invention is to provide an aircraft galley service vehicle that reduces the risk of accidents which result in damage or injury to equipment or operating personnel.

Another object of the invention is to provide an aircraft galley service vehicle that simplifies the onboard organization of food and beverage carts to promote efficient ground crew operations by including lazy susan partitioned storage compartments in an elevated cabin of the vehicle.

SUMMARY OF THE INVENTION

The objects identified above, as well as other features of the invention are incorporated in a vehicle that, due to a combination of its characteristics including its circular shape and the configuration of its drive wheels, provides unique maneuverability and efficiency. When the circular vehicle is combined with a circular revolvable storage compartment disposed on a lift, such combination provides for efficient handling and transport of galley food and drink carts with minimal space required for maneuverability and safety of operation.

The vehicle according to one embodiment of the invention has a frame with a perfectly round outer surface about its perimeter and substantially no external appendages. That outer surface is characterized as a perfect, unobstructed smooth circle defined by a vertical axis of the vehicle. The vehicle has two independent drive wheels located on a horizontal axis which intersects the vertical axis. Each wheel is at exactly the same distance from the vertical axis, with each wheel having the capability to move independently and at infinitely variable speeds in either direction.

In operation, the axis of the drive wheels is rotated by rotating one wheel in one direction and the other in the opposite direction until it is perpendicular to the direction of the desired travel. The vehicle rotates about the vertical axis to any radial position without changing its original footprint. The "footprint" is the area on the ground below the vehicle when it is at rest. Once the desired drive axle orientation is reached (perpendicular to the desired direction of travel), both wheels are driven forward equally, causing the vehicle to move in the direction perpendicular to the drive wheel axis. Thus, the vehicle is capable of movement in any direction and has a zero turn radius. The omni-directional maneuvering characteristics of the vehicle reduce the operating space on the ground required to service an aircraft cabin, thus increasing operating efficiency. Safety is increased because the operator, positioned at the center of the vehicle, is always facing the direction the vehicle is moving, never having to back up or look backwards.

The vehicle includes a circular carrousel cabin disposed on a lift for storage and transfer of food and drink carts between an aircraft galley and an airport catering depot. An operators station is positioned in the center of the carrousel cabin, and a lazy susan-style food and drink cart compartment and turntable are circumpositioned about the operators station.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 1:
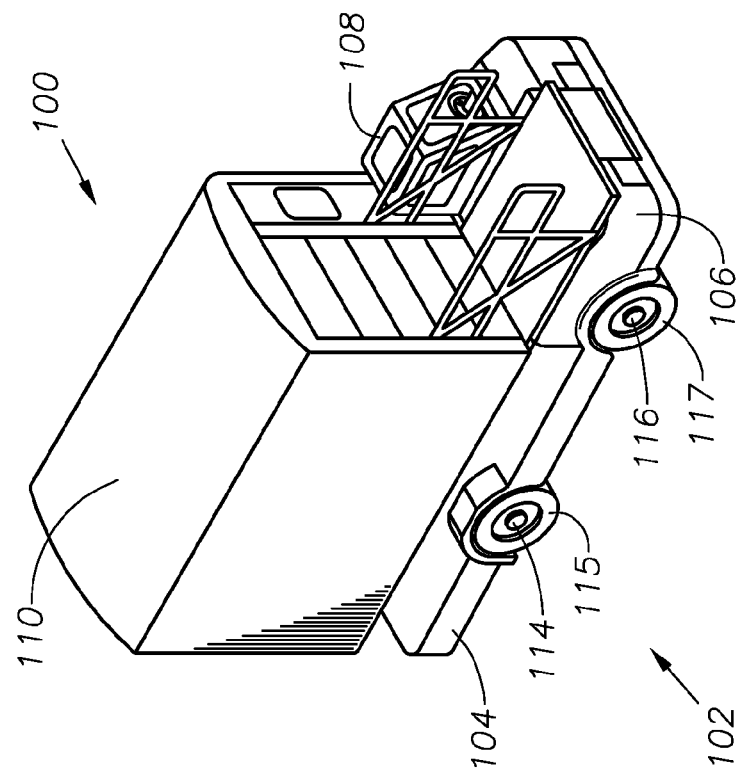
FIG. 1 is a perspective view of a typical aircraft galley service vehicle of prior art showing a conventional vehicle chassis with rear drive wheels and front steerable wheels and a cabin elevated on a scissor lift.
Figure 2:
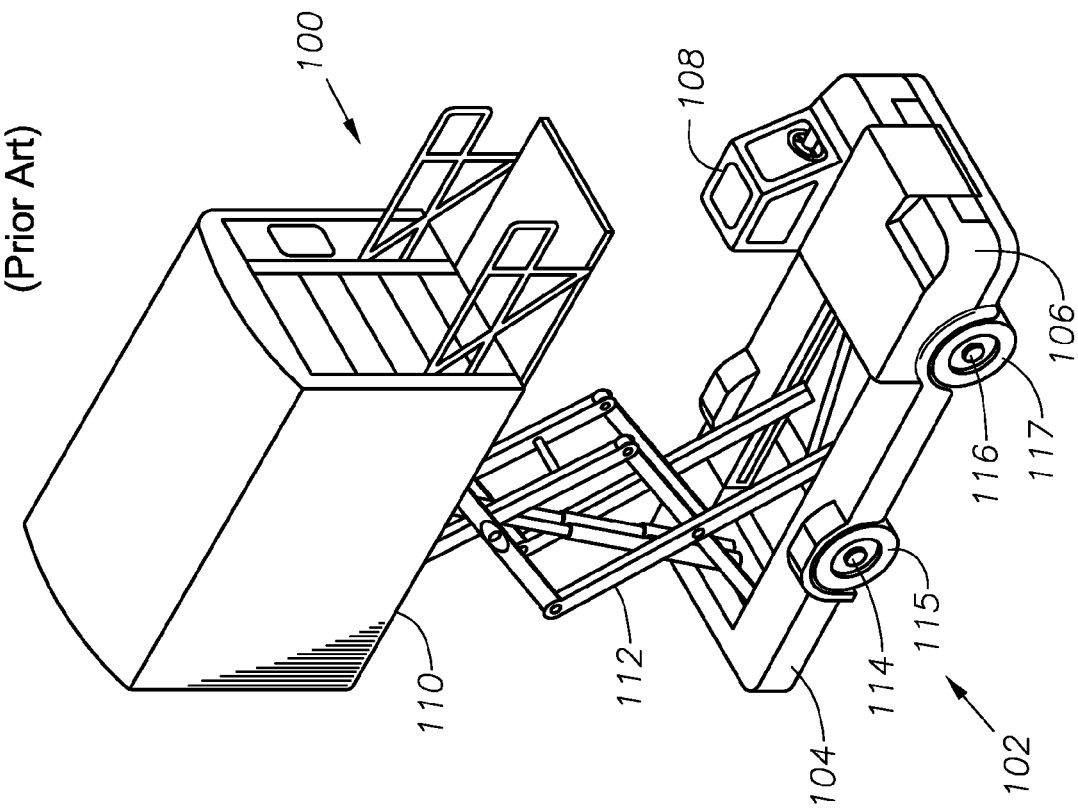
FIG. 2 is a perspective view of the prior art aircraft galley service vehicle of FIG. 1 shown with the cabin retracted to a stowed position.
Figure 3:
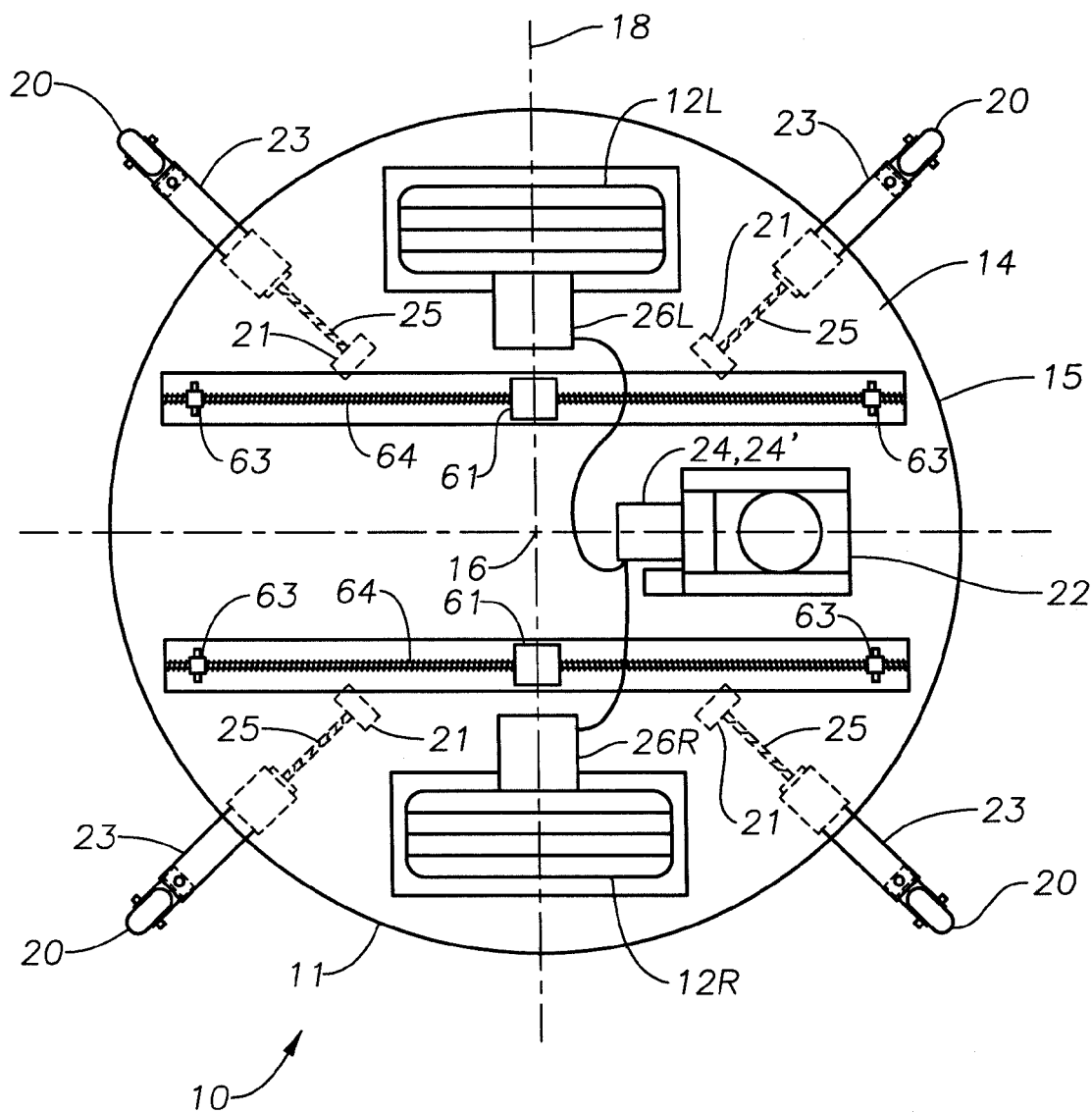
FIG. 3 is a horizontal cross section taken along lines 3-3 of FIG. 6 of an omni-directional vehicle (ODV) according to an embodiment of the invention showing a base assembly with independent drive wheels, a power source, caster wheels on adjustable outrigger arms, and lead screw actuators for operating a scissor lift.
Figure 6:
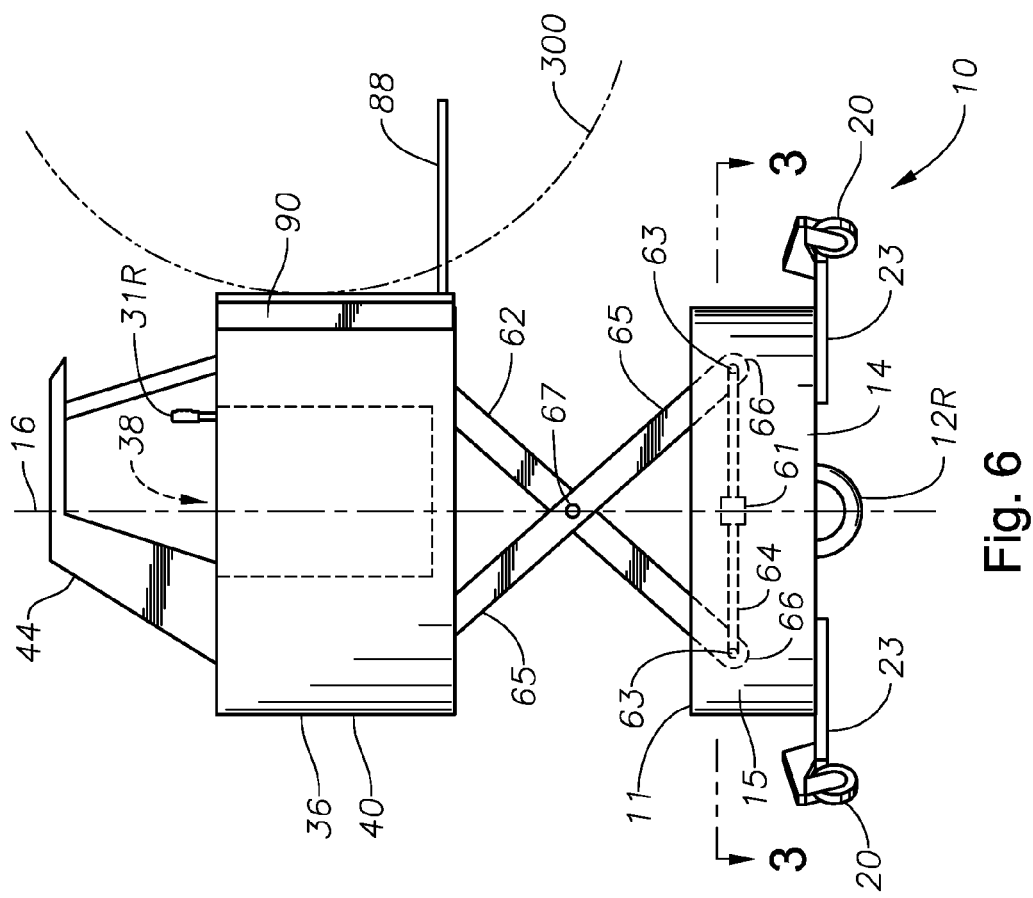
FIG. 6 is a side view of the ODV of FIG. 5 shown positioned abutting an aircraft fuselage with an extendable gangplank positioned therein for galley servicing operations.

FIG. 3 is a horizontal cross section, taken along lines 3-3 of FIG. 6, looking down into the base assembly 11 of an Omni-Directional Vehicle 10 (hereafter ODV) according to one embodiment of the invention. The base 11 has a frame 14 which has an outer perimeter 15 in the shape of a circle. The circular frame 14 has a vertical axis 16 which is perpendicular to the horizontal plane of FIG. 3. ODV 10 includes two drive wheels 12R, 12L rotatively mounted on frame 14. The drive wheels 12R, 12L are mounted along a horizontal axis 18 which is perpendicular to and intersects vertical axis 16 as shown in FIG. 3.

Referring to FIG. 3, a power source 22 is mounted on the frame 14. The power source 22 is preferably a diesel engine but other sources 22 may be used, including a gasoline internal combustion engine or turbine engine. In one embodiment, power source 22 drives an electrical generator 24 in a manner similar to a motive drive assembly of a diesel-electric locomotive for train service, for example. The generator 24 provides electrical power to two separate motor assemblies 26R, 26L, one for driving each wheel 12R, 12L. Drive motors 26R, 26L are preferably DC electric motors which allow continuously variable speed in either direction and instant starting, stopping and reversing. The speed and direction of rotation of motors 26R, 26L (and the drive wheels 12R, 12L driven thereby) are controlled by two user-operated control levers 31R, 31L (FIGS. 4-5), which cause drive current to be supplied to motors 26R, 26L for the desired motion.

In an alternate embodiment of the invention, power source 22 drives a hydraulic pump 24' instead of an electrical generator 24. Drive motors 26R, 26L are bidirectional gear-type hydraulic motors. The hydraulic pump provides balanced pressurized hydraulic fluid to the two separate motor assemblies 26R, 26L, one for each drive wheel 12R, 12L. The speed and direction of rotation of motors 26R, 26L, and the drive wheels 12R, 12L driven thereby, are controlled by user-operated hand levers 31R, 31L (FIGS. 4-5) that selectively port hydraulic fluid to the motors 26R, 26L.

ODV control inputs preferably include two user-operated hand levers 31R, 31L (FIGS. 4-5), one for an operator's right hand and the other for the operator's left hand. The right and left control levers 31R, 31L operate exactly the same to control the right and left drive wheels 12R, 12L, respectively. Each lever 31R, 31L has a neutral position, such that when a lever is at the neutral position, the wheel 12R, 12L associated with that lever is electrically or hydraulically braked. If a lever 31R, 31L is pushed forward away from the operator, the corresponding wheel motor 26R, 26L is driven in the forward direction for turning its attached drive wheel 12R, 12L. Likewise, if a lever 31R, 31L is pulled toward the operator, the corresponding motor 26R, 26L and drive wheel 12R, 12L are driven in reverse. The greater distance that a lever 31R, 31L is moved from its neutral position, the faster the associated wheel motor 26R, 26L and drive wheel 12R, 12L turn.

If both levers 31R, 31L are moved in the same direction and amount and at the same time, both drive wheels 12R, 12L move at the same speed, thereby causing straight-ahead movement of ODV 10 over the ground. That movement is perpendicular to horizontal axis 18. If levers 31R, 31L are pushed forward or backward at an unequal distance from each other, the lever 31R, 31L moved the greater distance will produce a greater speed of rotation, causing ODV 10 to turn in the direction of the slower drive wheel 12R, 12L. For example, if the right control lever 31R is pushed farther forward than is the left lever 31L, ODV 10 turns to the left, and vice versa.

If the right lever 31R is moved forward and the left lever 31L is moved backward and both lever positions are the same in amount and opposite in direction, the left wheel 12L turns backward and the right wheel 12R turns forward, both at the same rate of rotation. In this instance, ODV 10 turns to the left within its own footprint while its footprint generally remains stationary over ground, i.e., the ODV rotates about the vertical axis 16. (The footprint over the ground is the area of the ground beneath the vehicle.) The counter-clockwise rotation described above becomes a clockwise rotation when the right wheel 12R rotates backward at the same rate as the forward rotation of the left wheel 12L. Thus, the ODV 10 can change its heading while generally not moving or varying its footprint over the ground. Generally, if the ODV 10 does not interfere with any object on the ground at one heading, it will not interfere with any object at any heading because the ODV footprint does not change during rotation.

A number of swivel caster wheels 20 are pivotably mounted to the frame 14, circumpositioned about the perimeter 15 of ODV 10. Caster wheels 20 balance ODV 10, keeping frame 14 substantially level and preventing ODV 10 from toppling. Swivel casters 20 are preferably mounted to frame 14 so as not to protrude substantially from outer perimeter 15 to prevent contact with other objects while the ODV 10 is moving. Although ODV 10 is illustrated as having four swivel casters 20, any number of swivel casters 20 may be employed at varying points along frame 14, depending on the weight distribution of ODV 10.

Each swivel caster 20 is preferably mounted to the distal end of an extendable outrigger arm 23. The extendable and retractable outriggers 23, moved telescopically by linear actuators 25, are preferably coupled to the underside of frame 14. Linear actuators 25 may be lead screw assemblies or rack and pinion assemblies driven by motors 21, for example.

Figure 5:
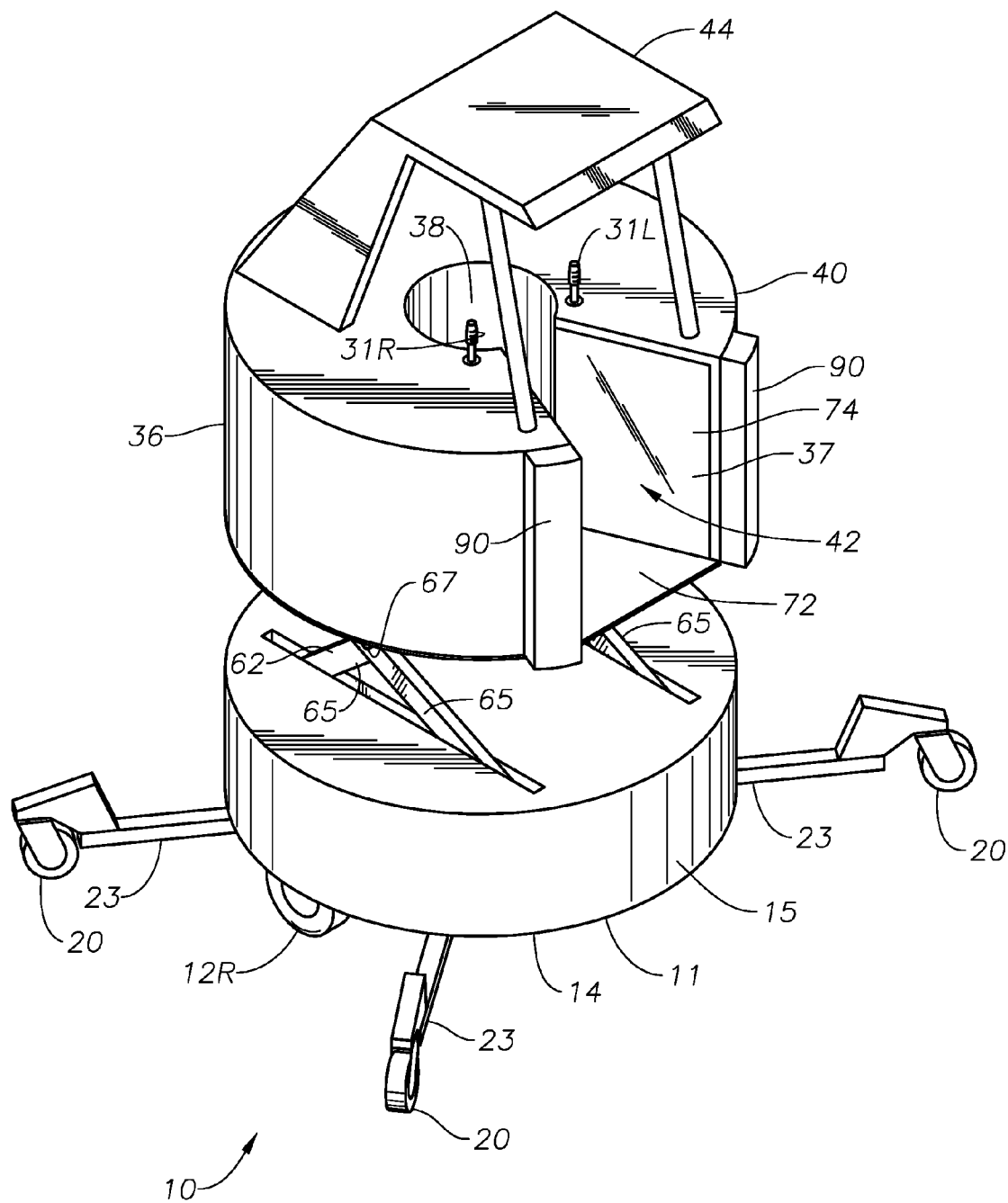
FIG. 5 is a perspective side view of the ODV of FIG. 4 shown with the outrigger support arms in an extended position and the carrousel cabin elevated from the base assembly by a scissor lift.

FIG. 3 also illustrates two lead screw actuators 64 for raising and lowering a scissor lift 62 (FIGS. 5-6). Each lead screw actuator 64 has a bidirectional motor 61 characterized by long, double threaded shafts that drive a pair of carriages 63 inwards and outwards. Each carriage pair 63 is pivotally coupled to the lower ends 66 of a pair of scissor arms 65 (FIGS. 5-6). Each pair of scissor arms are pivotally coupled together at their midpoints 67 (FIGS. 5-6), so that coordinated movement of carriages 63 causes scissor lift 62 to raise or lower. Alternatively, hydraulic cylinders or other actuator arrangements may be used in place of lead screw actuators 64 as appropriate. As actuators are well known in the art, they are not discussed further herein.

Figure 4:
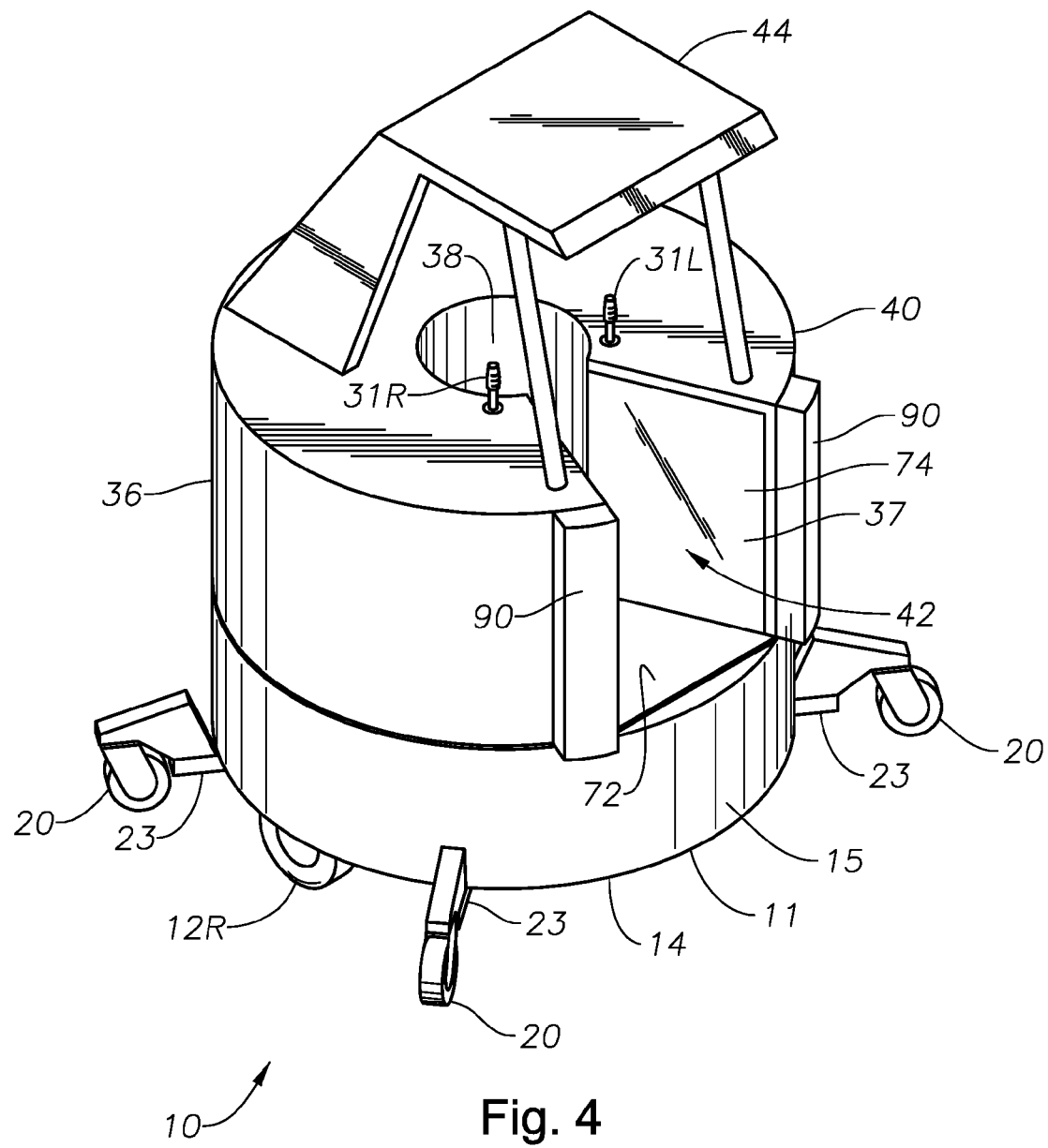
FIG. 4 is perspective side view of the ODV of FIG. 3 showing a cylindrical base assembly with drive wheels, outrigger support arms disposed in a retracted position, and a cylindrical carrousel cabin assembly disposed on top of the base, having an operating station centered therein and a circumferential lazy susan housing with turntable.
Figure 7:
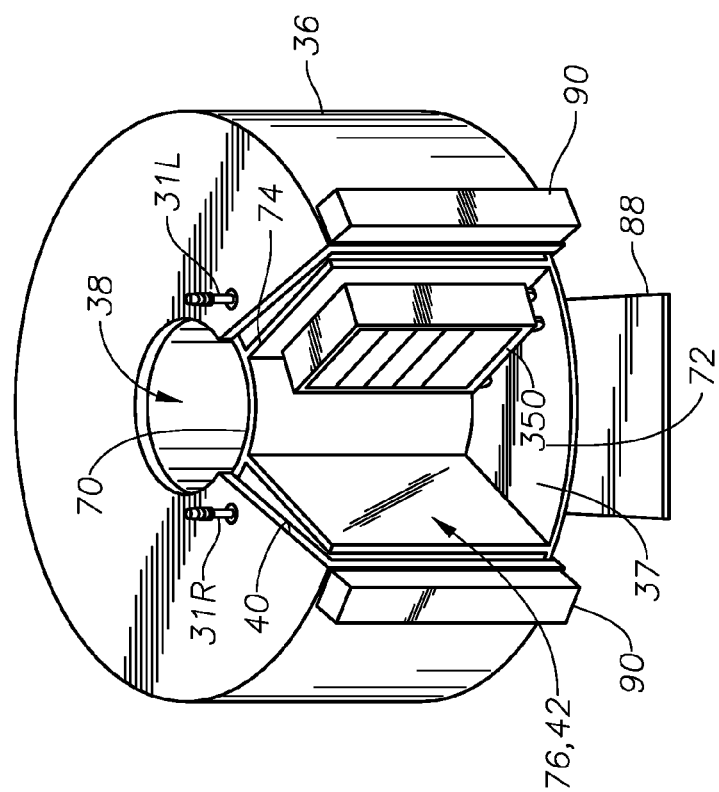
FIG. 7 is a perspective front view of a portion of the carrousel cabin assembly of the ODV of FIG. 5 with the canopy removed, showing the gangplank extended and the turntable rotated to supply a drink cart for transfer to the aircraft.
Figure 8:
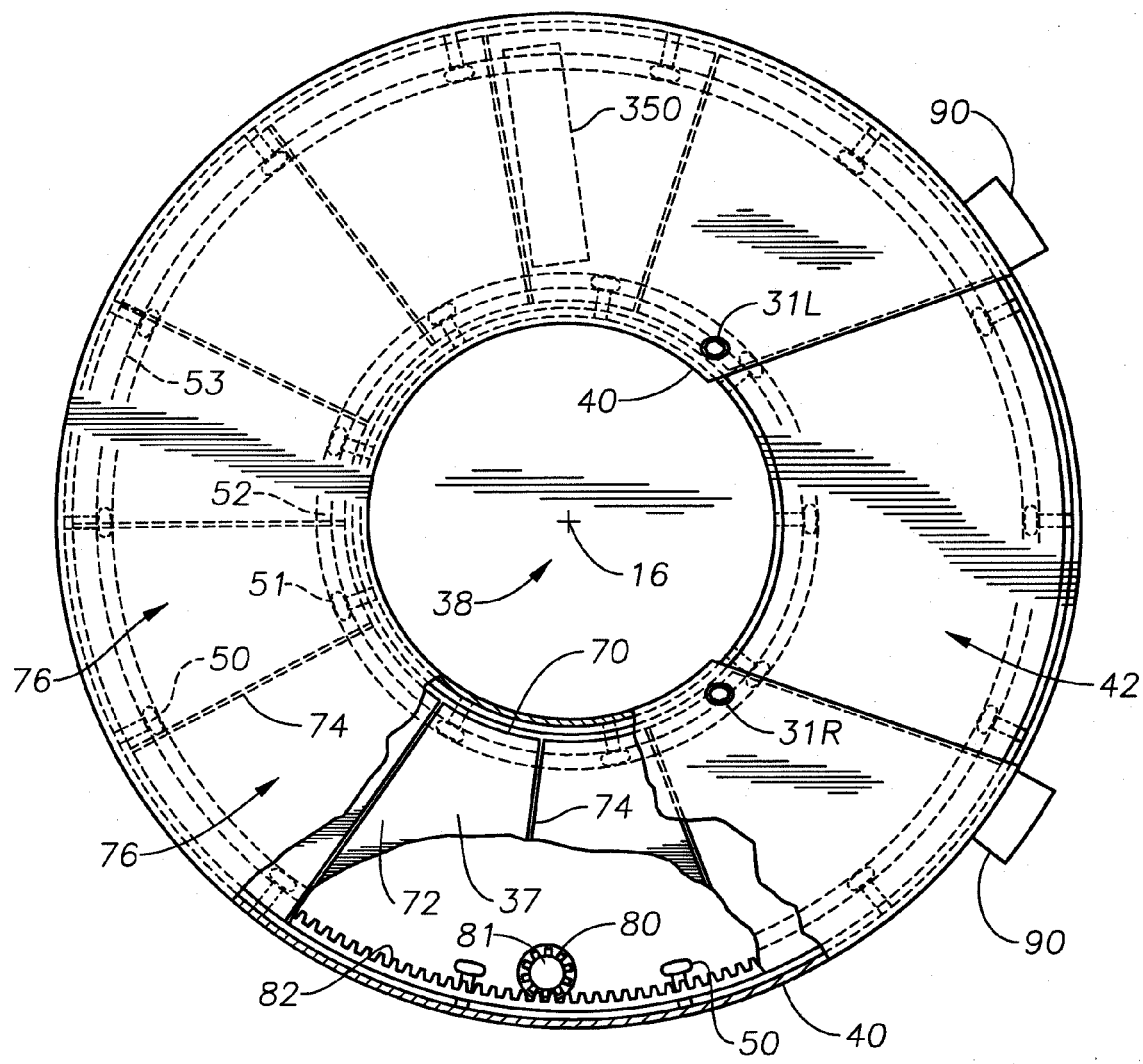
FIG. 8 is a top view of the carrousel cabin assembly of the ODV of FIG. 7 with portions of the lazy susan housing and turntable deck cut away to reveal the internal structure thereof.

FIGS. 4-6 are views of ODV 10 according to a preferred embodiment. Referring to FIGS. 4-6, a carrousel cabin 36 is shown mounted to the ODV frame 14. The carrousel cabin 36 preferably has a cylindrical shape, although other shapes may be used. Carrousel cabin 36 has an operators station 38 centered therein and control levers 31R, 31L for an operator to control movement of the vehicle 10. A canopy 44 is preferably provided to shelter operators station 38 from sun and precipitation. Resilient fenders 90 are attached to the forward portion of carrousel cabin 36 to protect the aircraft fuselage (not shown) from impact with ODV 10. Operators station 38 is surrounded by a lazy susan storage housing 40, that includes a turntable 37 that is designed and arranged to house aircraft food and drink carts 350 (FIGS. 7-8). Lazy susan storage housing 40 is preferably shaped like a toroid or doughnut with a wedge 42 removed to provide easy access to and from operators station 38. In other words, the lazy susan housing 40 of carrousel cabin 36 is open in front (when turntable 37 is rotated to a stowed position) to allow the operator to move forward into the aircraft galley.

The carrousel cabin 36 assembly is supported by a scissor lift 62 having pivoting arms 65, although other lift mechanisms may be used. The carrousel cabin assembly 36 is preferably raised and lowered by lead screw actuators 64 (FIG. 3) pivotably connected between the lower ends 66 of arms 65. Motors 61 (FIG. 3) are double-shafted stepper or servo motors with lead screws connected to each shaft. In its lowest position, carrousel cabin assembly 36 is disposed directly atop base assembly 11, as illustrated in FIG. 4, for easily transferring food and drink carts 350 (FIGS. 7-8) between carrousel cabin 36 and an airport catering depot (not illustrated). The carrousel cabin 36 is elevated by lift 62 so that turntable floor 72 is approximately disposed at the galley floor elevation of the aircraft (FIG. 6), as illustrated in FIGS. 5-6, for easily transferring food and drink carts 350 (FIGS. 7-8) between carrousel cabin 36 and aircraft 300. An extendable and retractable gangplank 88 (FIG. 6) is disposed at the floor level of turntable 37 to extend to the galley deck of aircraft 300 for facilitating the transfer of food and beverage carts 350 (FIGS. 7-8) between ODV 10 and aircraft 300.

Outriggers 23 are preferably retracted into a radially inward position to minimize the vehicle footprint when the carrousel cabin 36 is at a lowered elevation (FIG. 4), and outriggers 23 are preferably radially extended into a bracing position (FIGS. 3 and 5) to provide additional support to ODV 10 when the carrousel cabin (and hence the center of gravity) is raised during gallery servicing operations.

FIGS. 7 and 8 show carrousel cabin 36 with canopy 44 (FIGS. 4-6) removed for simplification. Carrousel cabin 36 preferably has a cylindrical shape, although other shapes may be used. Carrousel cabin 36 has an operators station 38 centered therein and control levers 31R, 31L for an operator to control movement of the vehicle 10. Operators station 38 is surrounded by a lazy susan storage housing 40 that substantially encloses turntable 37. Turntable 37 rotates about vertical axis 16 and is designed and arranged to house aircraft food and drink carts 350. Lazy susan storage housing 40 is preferably shaped like a toroid or doughnut with a wedge 42 removed. Likewise, turntable 37 includes an 'O' or ring-shaped floor 72 and a 'C'-shaped inner wall 70 that together define a toroid or doughnut-shaped storage means having only the floor 72 exposed at wedge 42 of housing 40 when turntable 37 is rotated to a stowed orientation. Thus, access to operators station 38 is provided via the open wedge section 42 when turntable 37 is rotated to the stowed position (FIGS. 4-5 and 8) but is prevented by turntable inner cylindrical wall 70 when turntable 37 is rotated to any other position (FIG. 7). Turntable 37 includes a number of partition walls 74 to divide it into a number of storage compartments 76 that are enclosed by lazy susan storage housing 40 when turntable 37 is oriented in the stowed position. To access the contents 350 of a particular storage compartment 76, turntable 37 is simply rotated to orient that particular compartment in alignment with wedge cutout 42, as shown in FIG. 7.

Turntable 37 is mounted to carrousel cabin 36 by a ball or roller bearing assembly, although other suitable bearing arrangements may be used. For example, FIG. 8 shows an arrangement of inward facing outer rollers 50 circumpositioned inside the perimeter of carrousel cabin 36 and an arrangement of outward facing inner rollers 51 circumpositioned about operators station 38. The underside of turntable 37 includes indented circular inner and outer races 52, 53 that receive inner and outer rollers 51, 50, respectively.

Referring to FIG. 8, the rotation of turntable 37 is controlled by a turntable motor 80 that has a pinion 81 that engages a circular rack 82 mounted to the underside of turntable 37, although other mechanisms may be used. Turntable motor 80 is preferably electric or hydraulic and capable of incremental positioning and indexing. As actuators are well known in the art, they are not discussed further herein.

The Abstract of the Disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A ground support vehicle (10) comprising:
   an omni-directional vehicle (11) defining a vertical axis (16);
   a lift (62) coupled to said omni-directional vehicle;
   a platform (37) revolvably coupled to said lift so as to rotate about said vertical axis;
   whereby said lift raises and lowers the elevation of said platform with respect to said omni-directional vehicle; and
   a plurality of outrigger arms (23) having proximal ends coupled to said frame (14), said outrigger arms disposed along a plurality of radials of said vertical axis and circumpositioned symmetrically about the perimeter of said vehicle (10), said plurality of outrigger arms arranged and designed to extend and retract along said plurality of radials; and
   a plurality of swivel casters (20) coupled to distal ends of said outrigger arms;
   whereby said plurality of outrigger arms and said plurality of swivel casters cooperate to support said vehicle (10).

2. The ground support vehicle (10) of claim 1 wherein said omni-directional vehicle comprises:
   a frame (14); and
   first and second drive wheels (12R, 12L) rotatively coupled to said frame, each of said drive wheels capable of independent powered forward and rearward rotation about a horizontal axis (18) that intersects said vertical axis (16), said first and second drive wheels designed and arranged to revolve about said vertical axis.

3. The ground support vehicle (10) of claim 1 further comprising:
an operators station (38) disposed on said lift generally at the elevation of said platform, whereby said lift raises and lowers the elevation of said operators station;
a first control lever (31R) positioned on a first side of said operators station being operatively coupled to a first motor (26R) for controlling the speed and direction of said first drive wheel (12R); and
a second control lever (31L) positioned on a second side of said operators station being operatively coupled to a second motor (26L) for controlling the speed and direction of said second drive wheel (12L).

4. The ground support vehicle of claim 3 wherein:
said vertical axis (16) passes through said operators station (38); and
said platform (37) is characterized generally by the shape of a ring formed about said vertical axis, said operators station bounded by said platform.

5. The ground support vehicle of claim 1 wherein:
said platform (37) comprises a plurality of compartments (76) defined by a plurality of partitions (74) and dimensioned for receiving an aircraft galley service cart (350).

6. The ground support vehicle of claim 1 further comprising:
a housing (40) connected to said lift and substantially disposed about said platform.

7. The ground support vehicle of claim 1 further comprising:
a gangplank (88) extendibly and retractably coupled to said lift so as to be raised and lowered with respect to said omni-directional vehicle by said lift.

8. The service vehicle of claim 1 wherein said vehicle (10) further comprises:
a frame (14),
first and second drive wheels (12R, 12L) rotatively coupled to said frame, each of said drive wheels capable of independent powered forward and rearward rotation about a horizontal axis (18) that intersects said vertical axis (16), said first and second drive wheels designed and arranged to revolve about said vertical axis;
a first control level (31R) positioned on a first side of said operators station being operatively coupled to a first motor (26R) for controlling the speed and rotation of said first drive wheel (12R); and
a second control lever (31L) positioned on a second side of said operators station being operatively coupled to a second motor (26L) for controlling the speed and rotation of said second drive wheel (12L).

9. The service vehicle of claim 1 wherein:
said lift is a scissor lift.

10. A service vehicle (10) comprising:
an omni-directional vehicle (11) defining a vertical axis (16);
a lift (62) coupled to said omni-directional vehicle;
an operators station (38) arranged and designed for maneuvering said omni-directional vehicle coupled to said lift so as to be raised and lowered with respect to said omni-directional vehicle by said lift; and
a plurality of outrigger arms (23) having proximal ends coupled to said frame (14), said outrigger arms disposed along a plurality of radials of said vertical axis and circumpositioned symmetrically about the perimeter of said vehicle (10), said plurality of outrigger arms arranged and designed to extend and retract along said plurality of radials; and a plurality of swivel casters (20) coupled to distal ends of said outrigger arms;
whereby said plurality of outrigger arms and said plurality of swivel casters cooperate to support said vehicle (10).

11. The service vehicle of claim 10, further comprising:
said vertical axis (16) passes through said operators station (38); and
a platform (37) revolvably coupled to said lift so as to rotate about said vertical axis, said platform (37) characterized generally by the shape of a ring formed about said vertical axis, said operators station bounded by said platform.

12. The service vehicle of claim 11 wherein:
said platform (37) comprises a plurality of compartments (76) defined by a plurality of partitions (74) and dimensioned for receiving an aircraft galley service cart (350).

13. The service vehicle of claim 11 further comprising:
a housing (40) connected to said lift and substantially disposed about said platform.

14. The service vehicle of claim 10 further comprising:
a gangplank (88) extendibly and retractably coupled to said lift so as to be raised and lowered with respect to said omni-directional vehicle by said lift.

15. The service vehicle of claim 10 wherein said omni-directional vehicle comprises:
a frame (14); and
first and second drive wheels (12R, 12L) rotatively coupled to said frame, each of said drive wheels capable of independent powered forward and rearward rotation about a horizontal axis (18) that intersects said vertical axis (16), said first and second drive wheels designed and arranged to revolve about said vertical axis.

16. In an omni-directional vehicle characterized by a generally circular shaped defining a vertical axis (16) and having a frame (14) and first and second drive wheels (12R, 12L) rotatively coupled to said frame, each of said drive wheels capable of independent powered forward and rearward rotation about a horizontal axis (18) that intersects said vertical axis, said first and second drive wheels being designed and arranged to revolve about said vertical axis, the improvement comprising:
a plurality of outrigger arms (23) having proximal ends coupled to said frame, said outrigger arms disposed along a plurality of radials of said vertical axis and circumpositioned symmetrically about the perimeter of said vehicle (10), said plurality of outrigger arms arranged and designed to extend and retract along said plurality of radials; and
a plurality of swivel casters (20) coupled to distal ends of said outrigger arms;
whereby said plurality of outrigger arms and said plurality of swivel casters cooperate to support said vehicle (10).

17. The omni-directional vehicle of claim 16, further comprising:
a lift (62) coupled to said omni-directional vehicle;
a platform (37) revolvably coupled to said lift so as to rotate about said vertical axis;
whereby said lift raises and lowers the elevation of said platform with respect to said omni-directional;
an operators station (38) disposed on said lift generally at the elevation of said platform, whereby said lift raises and lowers the elevation of said operators station;
a first control lever (31R) positioned on a first side of said operators station being operatively coupled to a first motor (26R) for controlling the speed and direction of said first drive wheel (12R); and a second control lever (31L) positioned on a second side of said operators station being operatively coupled to a second motor (26L) for controlling the speed and direction of said second drive wheel (12L).

18. The omni-directional vehicle of claim 17 wherein:
said vertical axis (16) passes through said operators station (38); and
said platform (37) is characterized generally by the shape of a ring formed about said vertical axis, said operators station bounded by said platform.

19. The omni-directional vehicle of claim 17 wherein:
said platform (37) comprises a plurality of compartments (76) defined by a plurality of partitions (74) and dimensioned for receiving an aircraft galley service cart (350).

20. The ground support vehicle of claim 17 further comprising:
a housing (40) connected to said lift and substantially disposed about said platform.

\* \* \* \* \*